Jan. 19, 1954 P. F. SMITH 2,666,805

LEAD-IN TERMINAL

Filed Feb. 3, 1951

PAUL F. SMITH
INVENTOR.

BY Everett W. Curtis
ATTORNEY

Patented Jan. 19, 1954

2,666,805

UNITED STATES PATENT OFFICE 2,666,805

LEAD-IN TERMINAL

Paul F. Smith, Los Angeles, Calif., assignor to Rohr Aircraft Corporation, Chula Vista, Calif., a corporation of California Application February 3, 1951, Serial No. 209,219

5 Claims. (Cl. 174—153)

My invention relates to an improved lead-in terminal which is effectively insulated and sealed at its point of entry through a wall requiring protected electric insulation.

There are many electrical installations which require the insertion of terminals, or other conductors, through supporting structures, for example, through the housing of transformers, electrical motors and generators, or through the bulkheads of installations carrying electrical systems. The terminals and conductors must be insulated from the structures through which they may be inserted and the point of entry must be sealed against the loss of fluids, as in the case of oil filled transformers, or against the passage of air and moisture, as in the case of motors, generators, or pressurized cabins in airplanes.

Many of the existing means for sealing and insulating such installations have not been satisfactory, as the expansion and contraction of the conductor from temperature changes loosens the seal and leakage occurs. Where the installation is subject to vibration, the seal is likely to be impaired or the insulation broken. Also where the seal is formed by forceful compression of an unconfined rubber seal, the rubber tends to cold flow, which results in impairment of the seal. As is well recognized, some of the existing lead-in terminals are difficult to assemble, especially where tight fitting rubber bushings or other parts are used, and it has been found that repeated assembly and disassembly of such terminals results in impaired insulating and sealing properties.

It is an object of this invention to provide a lead-in terminal with effective insulating and sealing properties.

Another object is to provide a device of this class which is easy to assemble.

Still another object is to provide a device of this class which can be assembled and disassembled many times without impairing its insulating and sealing properties.

A further object is to provide a device of this class which is simple to manufacture and economical to produce.

A still further object is to provide a device of this class which will withstand reasonable shock loads and torsional forces.

Other objects are apparent in the description as hereinafter set forth.

Attention is invited to the accompanying drawing illustrating two preferred forms of my invention, in which similar numerals of designation refer to similar parts throughout the several views, and in which.

Figure 1:
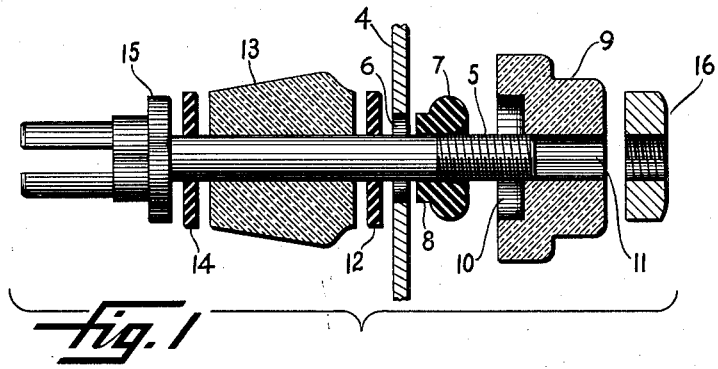
Figure 1 is a sectional view showing one form of my invention in a partially assembled condition.
Figure 2:
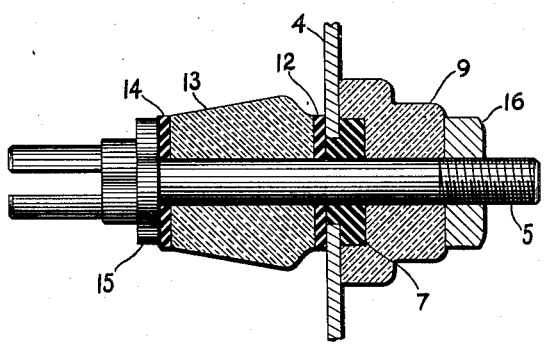
Figure 2 is a sectional view of the device completely assembled.
Figure 3:
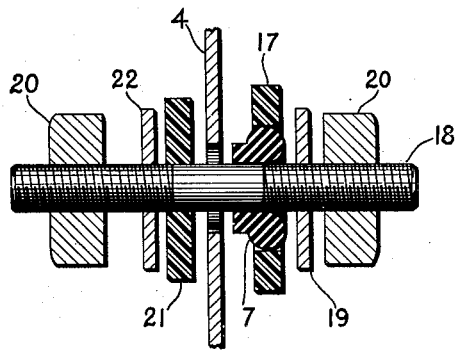
Figure 3 is a modified form of my invention shown in section and in a partially assembled condition.

Referring to Figures 1 and 2 of the drawing, the wall 4 represents the bulkhead or casing through which the metal conductor 5 is to be inserted, the wall is provided with a hole 6 slightly larger in diameter than the said conductor 5. The conductor may be threaded on one end and provided with a flange on the other end as illustrated in Figures 1 and 2, or it may be threaded on both ends for threaded fastener attachments, as shown in Figure 3. Closely surrounding said conductor and adjacent to one side of the wall 4 is the rubberlike ring 7 of resilient insulating material, being essentially of a torus shape and having a circular shoulder 8 which is adapted to fit freely into the hole 6 in the said wall 4. The shoulder 8 is preferably slightly greater in length than the thickness of the wall 4 so that when the shoulder is compressed upon assembly it will be flush with the face of the said wall and will be in sealing contact with the inner surface of hole 6 and the conductor 5. To provide sufficient dielectric resistance for high voltage terminals, the said shoulder may also be deeper and project out beyond the face of the wall 4 and be held snugly by a conforming insulating member. Surrounding the conductor 5 is the cup-shaped member 9 formed of rigid insulating material and having a circular recess 10 adapted to closely contain the resilient ring 7 and a central passage 11 for said conductor 5, said recess being slightly less in depth than the cross sectional diameter of the ring 7.

Adjacent to the other side of the wall 4, and surrounding the conductor 5, is the hard rubber washer 12. Adjacent to the outer face of the washer 12, and surrounding the conductor 5, is the member 13, which is preferably constructed of the same rigid insulating material as the cup-shaped member 9. One end of the said member 13, is adapted to bear against the outer face of the washer 12 while the other end is adapted to bear against the inner face of a similar washer 14 which is interposed between the said member 13 and the flanged end 15 of the metal conductor 5. The washers 12 and 14 are primarily provided to protect the member 13 from shock loads, it not being necessary to employ these washers in all applications of my lead-in terminal.

When the nut 16, on the threaded end of the metal conductor 5, is tightened, the rubberlike ring 7 is deformed into sealing contact with the said conductor 5, the marginal wall of recess 10 in the member 9, the contiguous portions of the wall 4 and the washer 12 (or the member 13 if the washer 12 is not employed) as shown in Figure 2. The particular forms and arrangements of the elements of my invention as shown will provide effective sealing and insulating of the lead-in terminals while allowing ease of assembly and disassembly without impairing the essential sealing and insulating properties.

Referring to Figure 3, adjacent to one side of the wall 4 is the rubberlike ring 7 which is similar in construction to that shown in Figures 1 and 2. Surrounding, and closely engaging the ring 7, is the annular retainer 17 which is constructed of rigid insulating material and slightly less in thickness than the cross sectional diameter of the said ring 7. Adjacent to the said retainer 17, and closely surrounding the conductor 18, is the washer 19 which is adapted to bear against the said retainer 17 and the resilient ring 7. Adjacent to the opposite side of the wall 4, and closely surrounding the conductor 18, is a collar 21 which is constructed of rigid insulating material. Adapted to bear against the outer face of the said collar 21, is the washer 22. A nut 20 is provided at each of the threaded ends of the conductor 18. Upon tightening the said nuts 20, the resilient ring 7 is deformed into sealing contact with the conductor 18, the retainer 17, the contiguous portions of the wall 4 and the collar 21.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim as new and useful and desire to secure by Letters Patent is:

1. A lead-in terminal for conducting electricity through a wall provided with an aperture, comprising in combination: an electrical conductor having a diameter smaller than said aperture and passing therethrough; a retainer of rigid insulating material surrounding said conductor on one side of said wall and whose end adjacent said wall is provided with a substantially cylindrical shaped recess; a unitary ring of resilient insulating material surrounding said conductor and positioned within said recess, said ring, when uncompressed, being essentially of torus shape with a cross sectional diameter greater than the depth of said recess and having a circular shoulder adapted to fit freely within the aperture in said wall and closely around said conductor; a member formed of insulating material surrounding said conductor on the other side of said wall and adapted to bear against said wall and said shoulder; and means for drawing the recessed end of said retainer against said wall and simultaneously causing said ring to be deformed into sealing contact with said wall, said conductor and also with said cylindrical and flat internal faces.

2. A lead-in terminal for conducting electricity through a wall provided with an aperture, comprising in combination: an electrical conductor having a diameter smaller than said aperture and passing therethrough; a retainer of rigid insulating material surrounding said conductor on one side of said wall and whose end adjacent said wall is provided with a substantially cylindrical shaped recess; a unitary ring of resilient insulating material surrounding said conductor and positioned within said recess, said ring, when uncompressed, being essentially of torus shape with a cross sectional diameter greater than the depth of said recess and having a circular shoulder adapted to fit freely within the aperture in said wall and closely around said conductor, said shoulder having a length slightly greater than the thickness of said wall; a member formed of insulating material surrounding said conductor on the other side of said wall and arranged to bear against said wall and said shoulder; and means for drawing the recessed end of said retainer against said wall and simultaneously causing said ring to be deformed into sealing contact with said wall, said conductor and also with said cylindrical and flat internal faces.

3. A lead-in terminal for conducting electricity through a wall provided with an aperture, comprising in combination: an electrical conductor having a diameter smaller than said aperture and passing therethrough; a retainer of rigid insulating material surrounding said conductor on one side of said wall, said retainer being provided with a central bore of greater diameter than the diameter of said conductor; a ring of resilient insulating material surrounding said conductor and closely positioned within said bore, said ring being essentially of torus shape with a cross sectional diameter greater than the thickness of said retainer and having a circular shoulder adapted to fit freely within the aperture in said wall and closely around said conductor; a washer closely surrounding said conductor and adapted to bear against said retainer and said ring; a member of rigid insulating material surrounding said conductor on the other side of said wall and adapted to abut against said wall and said shoulder; and means for drawing said retainer against said wall and simultaneously deforming said ring into sealing contact with said wall, the marginal wall of said bore, said conductor and the face of said washer.

4. A lead-in terminal for conducting electricity through a wall provided with an aperture, comprising in combination: an electrical conductor having a diameter smaller than said aperture and passing therethrough; a retainer of rigid insulating material surrounding said conductor on one side of said wall, said retainer being provided with a central bore of greater diameter than the diameter of said conductor; a ring of resilient insulating material surrounding said conductor and closely positioned within said bore, said ring being essentially of torus shape with a cross sectional diameter greater than the thickness of said retainer and having a circular shoulder adapted to fit freely within the aperture in said wall and closely around said conductor, said shoulder having a length slightly greater than the thickness of said wall; a washer closely surrounding said conductor and adapted to bear against said retainer and said ring; a member of rigid insulating material surrounding said conductor on the other side of said wall and adapted to abut against said wall and said shoulder; and means for drawing said retainer against said wall and simultaneously deforming said ring into sealing contact with said wall, the marginal wall of said bore, said conductor and the face of said washer.

5. A lead-in terminal for conducting electricity through a thin wall provided with a circular aperture having a length equal to the wall thickness, comprising: an electrical conductor having a diameter smaller than said aperture and passing therethrough; a ring deforming retainer surrounding said conductor on one side of said wall, the portion of said retainer adjacent the wall being composed of rigid insulating material and said portion being provided with a substantially cylindrical shaped recess; a unitary ring of resilient insulating material surrounding said conductor, said ring, when uncompressed, having a circular cross section of diameter greater than the depth of said recess and a cylindrical projecting shoulder adapted to fit freely within the aperture in the wall and closely around said conductor, said shoulder having a length slightly greater than the thickness of the wall; a ring compressing member formed of insulating material surrounding said conductor on the other side of said wall; and screw threaded means for drawing said ring compressing member against the end of said shoulder and said wall and drawing said retainer against the ring and wall to thereby deform said ring into sealing contact with the wall, said conductor and with the curved and flat marginal walls of said cylindrical shaped recess.

PAUL F. SMITH.

References Cited in the file of this patent

UNITED STATES PATENTS

| Number | Name | Date |
| --- | --- | --- |
| 1,638,482 | French et al. | Aug. 9, 1927 |
| 2,235,429 | Henry et al. | Mar. 18, 1941 |
| 2,418,729 | Schemers | Apr. 8, 1947 |
| 2,447,489 | Clark | Aug. 24, 1948 |
| 2,482,567 | Trowbridge | Sept. 20, 1949 |
| 2,550,112 | Fields | Apr. 24, 1951 |

FOREIGN PATENTS

| Number | Country | Date |
| --- | --- | --- |
| 709,005 | Germany | Aug. 4, 1941 |